(12) United States Patent
Willhoit et al.

(10) Patent No.: US 10,574,511 B2
(45) Date of Patent: Feb. 25, 2020

(54) CENTRALIZED PROCESSING OF EVENTS

(71) Applicant: Amazon Technologies, Inc., Seattle, WA (US)

(72) Inventors: Donald Ryan Willhoit, Bainbridge Island, WA (US); Raymond E. Mendoza, Seattle, WA (US); Peter F. Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/193,221

(22) Filed: Nov. 16, 2018

(65) Prior Publication Data

US 2019/0089576 A1    Mar. 21, 2019

Related U.S. Application Data

(63) Continuation of application No. 15/098,393, filed on Apr. 14, 2016, now Pat. No. 10,148,488, which is a continuation of application No. 12/246,580, filed on Oct. 7, 2008, now Pat. No. 9,317,343.

(60) Provisional application No. 61/040,342, filed on Mar. 28, 2008.

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *H04L 12/24* | (2006.01) |
| *G06F 9/54* | (2006.01) |
| *G06F 16/22* | (2019.01) |
| *G06F 11/30* | (2006.01) |
| *G06F 11/00* | (2006.01) |
| *H04L 12/26* | (2006.01) |
| *G06F 11/14* | (2006.01) |
| *G06F 11/34* | (2006.01) |

(52) U.S. Cl.
CPC .......... *H04L 41/0631* (2013.01); *G06F 9/542* (2013.01); *G06F 11/00* (2013.01); *G06F 11/006* (2013.01); *G06F 11/302* (2013.01); *G06F 11/3003* (2013.01); *G06F 11/3072* (2013.01); *G06F 16/2228* (2019.01); *H04L 43/04* (2013.01); *G06F 11/1446* (2013.01); *G06F 11/3409* (2013.01); *G06F 2201/86* (2013.01); *G06F 2201/865* (2013.01)

(58) Field of Classification Search
CPC .................................................. H04L 41/0631
USPC ....................................................... 719/318
See application file for complete search history.

(56) References Cited

U.S. PATENT DOCUMENTS

2007/0226231 A1*    9/2007    Venkat .................. G06Q 10/00

\* cited by examiner

*Primary Examiner* — Timothy A Mudrick
(74) *Attorney, Agent, or Firm* — Thomas | Horstemeyer, LLP

(57) ABSTRACT

Disclosed are systems, methods, and other embodiments relating to event processing. A plurality of events from a plurality of services are buffered in a server, each of the services being implemented in at least one service server. An indexed storage of the events is performed in a data store. Metrics are generated from the events, where a condition associated with an operation of the services may be determined from the metrics.

20 Claims, 4 Drawing Sheets

Event = ([timestamp], [name], [identifier=(namespace, OpaqueString)], [domain], [location], [timereceived], [sender], [message])
163 123
FIG. 3
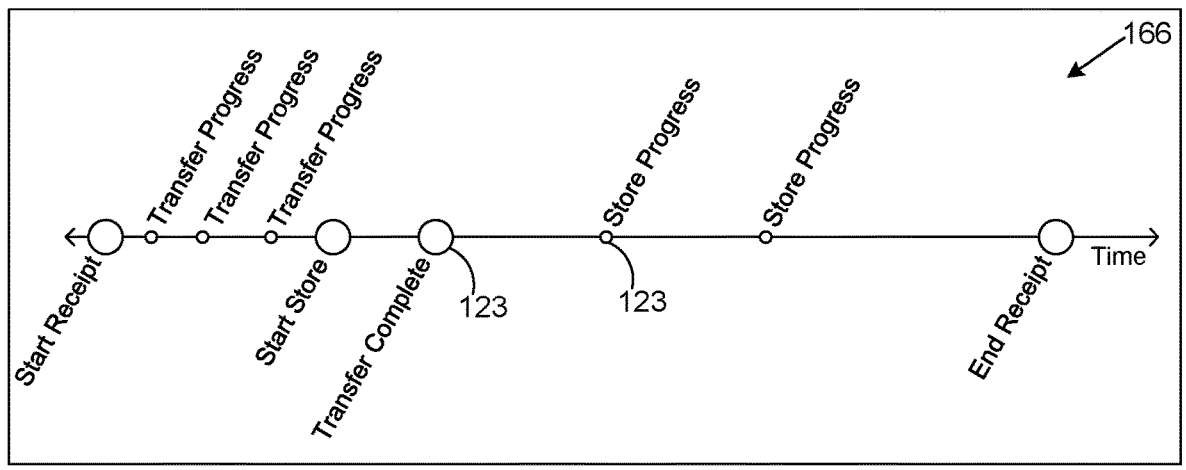
FIG. 4
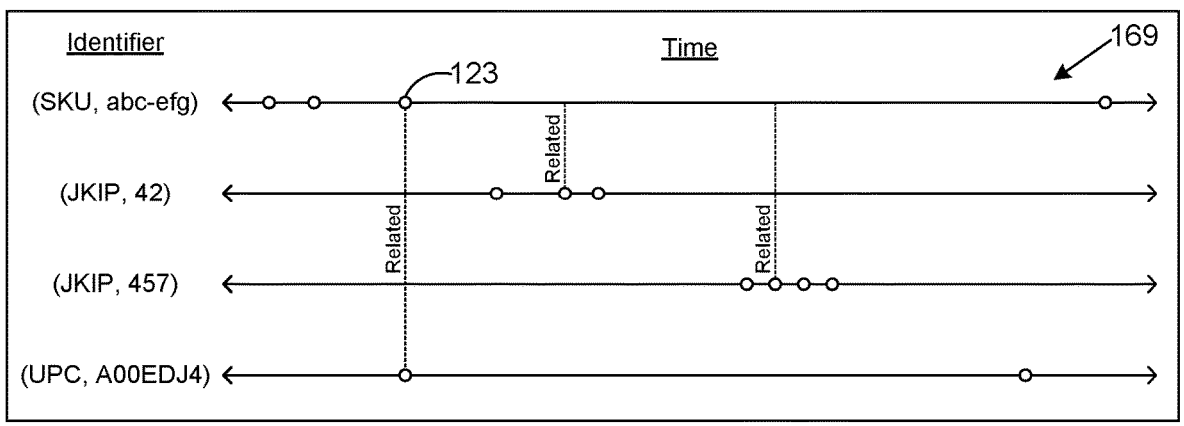
FIG. 5

CENTRALIZED PROCESSING OF EVENTS

CROSS REFERENCE TO RELATED APPLICATIONS

This application is a continuation of and claims priority to U.S. patent application Ser. No. 15/098,393, filed Apr. 14, 2016, entitled "CENTRALIZED PROCESSING OF EVENTS," now issued as U.S. Pat. No. 10,148,488, which claims priority to U.S. patent application Ser. No. 12/246, 580, filed on Oct. 7, 2008, entitled "CENTRALIZED PROCESSING OF EVENTS," now issued as U.S. Pat. No. 9,317,343, which claims priority to U.S. Provisional Patent Application No. 61/040,342, filed on Mar. 28, 2008, entitled "CENTRALIZED RECORDING OF EVENTS," the contents of which being incorporated by reference in their entirety herein.

BACKGROUND

As large scale data processing systems evolve for large entities principally engaged in commercial activity on the Internet, the processing of data items such as digital content items can become disjointed and inefficient. In some cases, where digital assets require processing by various different segments within an organization before they are available for commercial exploitation on the Internet, it is possible that the processing of such assets can be stalled along the way. In some situations, significant effort may need to be expended to determine where the stalled asset is in the data processing systems and why the stall occurred. Also, it can be difficult to track the processing of such assets even under normal operating conditions.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is an illustration of an event generated in the system of FIG. 1 according to an embodiment of the disclosure;

FIG. 4 is a drawing of a simple time line generated from events stored in an event data store associated with an event processing application of FIG. 2 according to an embodiment of the disclosure;

FIG. 5 is a drawing of a complex time line generated from events stored in an event data store associated with an event processing application of FIG. 2 according to an embodiment of the disclosure;

DETAILED DESCRIPTION

Figure 1:
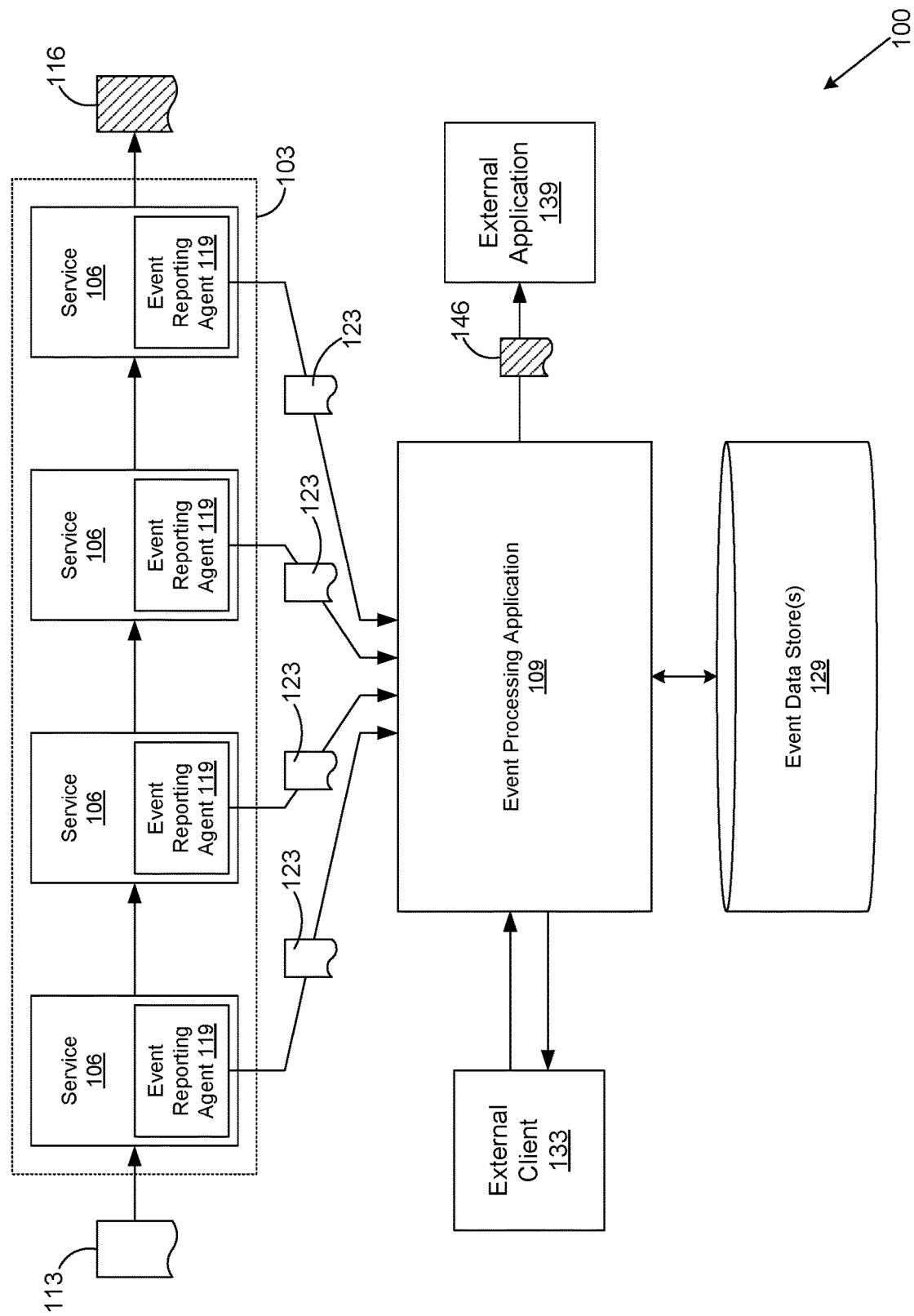
FIG. 1 is a drawing of a data processing system according to various embodiments of the disclosure.

With reference to FIG. 1, shown is a data processing system 100 according to various embodiments of the present disclosure. The data processing system 100 includes a workflow pipeline 103 that comprises a number of services 106 as will be described. Each of the services 106 may be executed on one or more servers or other hardware with like capability as can be appreciated. The data processing system 100 also includes an event processing application 109. Each of the services 106 within the workflow pipeline 103 is configured to perform at least one task associated with a process workflow. In one example embodiment, the process workflow involves processing target data 113. In such a case, the target data 113 emerges from the workflow pipeline 103 as processed data 116. Alternatively, each of the services 106 may perform a task with respect to a workflow process that does not necessarily involve target data 113 per se as will be described. The event processing application 109 receives events 123 from the services 106 as will be described.

According to various embodiments, the target data 113 may comprise, for example, digital content items such as digital representations of songs, movies, or other digital content items in various formats. Alternatively, the target data 113 can be any data that is processed by the various services 106 of the workflow pipeline 103. In general, the target data 113 is such that the services 106 perform the various tasks thereon, resulting in the processed data 116. For example, the processed data 116 can be the same as the target data 113, but embodied in a different format. Alternatively, the processed data 116 may differ significantly from the target data 113 such as may be the case when the tasks implemented by the services 106 comprise compression operations, translation of data in some manner, or other transformative types of operations as can be appreciated. As an additional alternative, the services 106 may be perform various tasks that are part of a workflow process that does not involve target data 113.

Each of the services 106 may include an event reporting agent 119. Each of the event reporting agents 119 comprises logic that operates in conjunction with the subsystems or other components of the service 106 that implements the respective tasks of the service 106. The event reporting agents 119 generate events 123 that are transmitted to the event processing application 109. Alternatively, the functionality of the event reporting agents 119 may be integrated with the operation of the respective services 106 rather than being a separate logical entity. A predefined set of events 123 may be associated with each of the services 106, where the events 123 associated with a given service 106 may relate to or are associated with the performance of one or more tasks performed by the given service 106.

The event processing application 109 includes various components and one or more event data stores 129. The event processing application 109 is implemented in order to receive the events 123 from the services 106 and to record such events 123 in the event data stores 129 as will be described. In doing so, the event processing application 109 may be configured to generate a timestamp of the time that the events 123 were received and may insert the timestamp as an attribute of the events 123 before they are stored in respective event data stores 129. In addition, the event processing application 109 may perform other operations on the events 123 before they are stored in the event data stores 129. Each of the event data stores 129 may comprise, for example, a database or other storage system.

In one embodiment, the events 123 are transmitted from the services 106 to the event processing application 109 asynchronously, where no acknowledgement is transmitted in reply. This may result in the loss of some events 123, however such losses should be minimal and typically may be tolerated.

The event processing application 109 cooperates with external clients 133 in order to retrieve various ones of the events 123 stored in one of the event data stores 129. For example, various events 123 may relate, for example, to the processing of specific target data 113. An external client 133 may request each of the events 123 associated with the target data 113 based on a given identifier in order to track the progress of the target data 113 through the workflow pipeline 103. To this end, the events 123 may indicate a progress of the target data 113 through the workflow pipeline 103. Alternatively, the events 123 may indicate the progress of a workflow process such as, for example, the progress of fulfillment of an order for goods, or other process. In such case, there may not be target data 113 as such, but a record of progress of the workflow may be maintained. In addition, relationships between different identifiers may be maintained, for example, by the event processing application 109 or other system. Such relationships may be employed to track or otherwise obtain or generate data associated with events 123 having different, but related identifiers.

The event processing application 109 is further configured to generate metrics 136 based upon the events 123 received from the services 106. Such metrics 136 may comprise values that describe various aspects of the events 123 or other data. The metrics 136 that may be generated depend upon the nature of the events 123. For example, one metric 136 may comprise the time duration between respective events 123 for a given identifier. Alternatively, for example, a metric 136 may comprise a time duration between events 123 having different identifiers, where a relationship between identifiers is maintained as described above. In another example, a metric 136 may comprise a count of certain events 123 received within a given time period for a given identifier, or for related identifiers, etc. Further, metrics 136 may describe sequences of events 123 received that show when events 123 associated with a given identifier or with related identifiers have been received out of order. In addition, there may be many other metrics 136 that may be generated based upon the events 123. In order to generate the metrics 136, the event processing application 109 may employ various heuristics or rules to generate metrics 136 based upon the events 123 received.

The external applications 139 communicate with the event processing application 109 to receive the metrics 136 and other data generated by the event processing application 109. According to one embodiment, the external systems 139 are configured to detect various conditions in the operation of the various services 106. Such conditions may be operational benchmarks, operational irregularities, errors, and/or any other type of condition. The circumstances that comprise a condition detected by the external applications 139 may be preconfigured. Upon detecting a given condition, the external applications 139 may take such action as is deemed necessary or important. In this respect, the detection and measuring functions of the external applications 139 are decoupled from the functionality of the event processing application 109 that generates the metrics 136. Thus, the event processing application 109 advantageously receives raw events 123 and generates useful metrics 136 from which the detection of various conditions can be performed.

In one embodiment, the tasks performed by each respective service 106 are independent of the tasks performed by the other ones of the services 106. In this respect, each service 106 is disconnected or is independent of the other services 106. Stated another way, no one service 106 knows about the operations or tasks performed by any of the other services 106. Thus, the services 106 may be described as "loosely coupled" systems in that they operate independently of each other, while at the same time, in order to process the target data 113, each service 106 may require certain functions to be performed by preceding services 106.

In one embodiment, the events 123 may indicate a status of the performance of a given task by a given service 106 with respect to the target data 113 as it progresses through the workflow pipeline 103. Thus, in one embodiment, the content of the events 123 stored in an event data store 129 can act as a marker that indicates the progress that the target data 113 is making through the workflow pipeline 103. For example, the events 123 may indicate whether a certain task has started or ended. Also, the events 123 may indicate whether certain component portions of tasks have completed, etc. Alternatively, the events 123 may indicate the progress of a workflow process. For example, such workflow processes may involve manufacturing processes, order fulfillment processes, processes for host provisioning for web site hosting and other hosting, processes for managing subscriptions and payment in conjunction with fulfillment of orders, processes related to digital content ingestion and reception, catalog feed ingestion processes, product recommendations processes, processes involving developer tools, and many other workflow processes.

Next, a general discussion of the operation of the various components of the data processing system 100 is provided. To begin, assume, for example, that the target data 113 is designated to be processed by the workflow pipeline 103. It is understood that the example described herein in terms of processing the target data 113 is discussed as one illustration, where the principles described herein apply to other processes as mentioned above. For the sake of illustration, we will make the assumption that the target data 113 comprises a digital content item such as a movie, song, or other item that is to be placed for sale, for example, on a network site that provides a merchant presence on the Internet. The digital content item represented by the target data 113 may be a very large file embodied in any one of a number of formats that require reduction, compression, or other processing to be embodied in a format acceptable for access over the Internet for consumption by the average consumer electronic devices owned by consumers.

To begin, the target data 113 is applied to the services 106 in a predefined progression in order to be transformed into the processed data 116 that can ultimately be downloaded, for example, to individual users over the Internet. As such, the services 106 perform various compression tasks, translation tasks, and other tasks to transform the target data 113 into the processed data 116. For example, the target data 113 may comprise a movie in a very large uncompressed file that needs to be compressed, for example, into an MPEG format or other appropriate format to be provided to set top boxes and the like.

In addition to processing the target data 113, the various tasks performed by the services 106 may also properly format the target data 113 so as to be recognizable for various other purposes as can be appreciated. While the services 106 perform the various tasks upon the target data 113, the services 106 may generate the events 123 that are transmitted to the event processing application 109.

According to one embodiment, the events 123 generated are idempotent. This refers to the fact that they may be sent by the service 106 to the event processing application 109 several times and are stored without duplication. This may occur, for example, in the case that the service 106 is temporarily rendered inoperative or has some other problem that results in the sending of duplicate events 123 to the event processing application 109.

Also, according to another embodiment, the events 123 are immutable when stored in the event data store 129 in that they do not change or cannot be changed over time. Alternatively, it may be possible that the events 123 are changed over time based upon the actions of various applications or systems that access such events 123 in the event data store 129.

In the event that the processing of the target data 113 by a respective one of the services 106 becomes stalled for some reason, then the events 123 can serve the purpose of identifying where the target data 113 exists in the workflow pipeline 103 and where the stall took place. For example, it can happen that the function of handing off target data 113 between services 106 may stall the processing due to errors in the handoff procedure. In this respect, as events 123 are received and stored in the event data store 129, the ultimate progress of the target data 113 through the workflow pipeline 103 is inherently maintained. This is because the events 123 act as markers that indicate the status of the performance of various tasks on the target data 113 by a respective one of the services 106.

Collectively, the events 123 stored in the event data stores 129 provide information as to the status and location of the target data 113 as it progresses through the workflow pipeline 103. To facilitate the use of the events 123 to determine the status of the target data 113 in the workflow pipeline 103, an identifier is associated with each of the events 123 generated by the services 106. The identifier may be the same for each event 123 generated for given target data 113 regardless of the service 106 that generated the event 123. That is to say, each event 123 generated by a given service 106 while performing a task with respect to the target data 113 includes the same identifier so that all of the events 123 stored in one of the event data stores 129 that pertain to the processing of the target data 113 can be accessed based upon the same identifier. Alternatively, different identifiers may be associated with various events 123, where relationships between identifiers may be maintained in an appropriate data store, etc. Ultimately, an external client 133 may access the events 123 associated with the target data 113 to identify the location of the target data 113 in the workflow pipeline 103 as well as the status of the processing of such target data 113 relative to the tasks performed by the respective services 106 as will be described. Further, the events 123 may be accessed based on one or more identifiers in order to generate timelines of the processing of target data 113 as will be described.

Thus, the event processing application 109 facilitates the collection of events 123 and can perform some limited analysis on such events 123 and store them for future operational reference. The event processing application 109 advantageously helps to track and monitor the processes implemented on the services 106 that are loosely coupled together in the workflow pipeline 103. As set forth above, the tasks performed by any given one of the services 106 may be completely independent of the tasks performed by the remaining ones of the services 106. Also, the events 123 may be obtained from the event data store 129 based upon a predetermined identifier or related identifiers, where individual events 123 include useful pieces of information.

In addition, the storage of the events 123 facilitates the computation of summary information over the entire stream of events 123 associated with given target data 113. Such computation may be performed by external applications 139 that receive metrics 136 or other data from the event processing application 109. Although queries may be generated to search through events 123 to analyze the performance of the tasks by the respective services 106 on the target data 113, according to one embodiment, the events 123 are not stored in the event data store 129 so as to facilitate the polling of such events 123 in order to discover specific occurrences of such events 123. Rather, in such an embodiment, the events 123 provide a chronological story of the progress of the target data 113 through the workflow pipeline 103.

Figure 2:
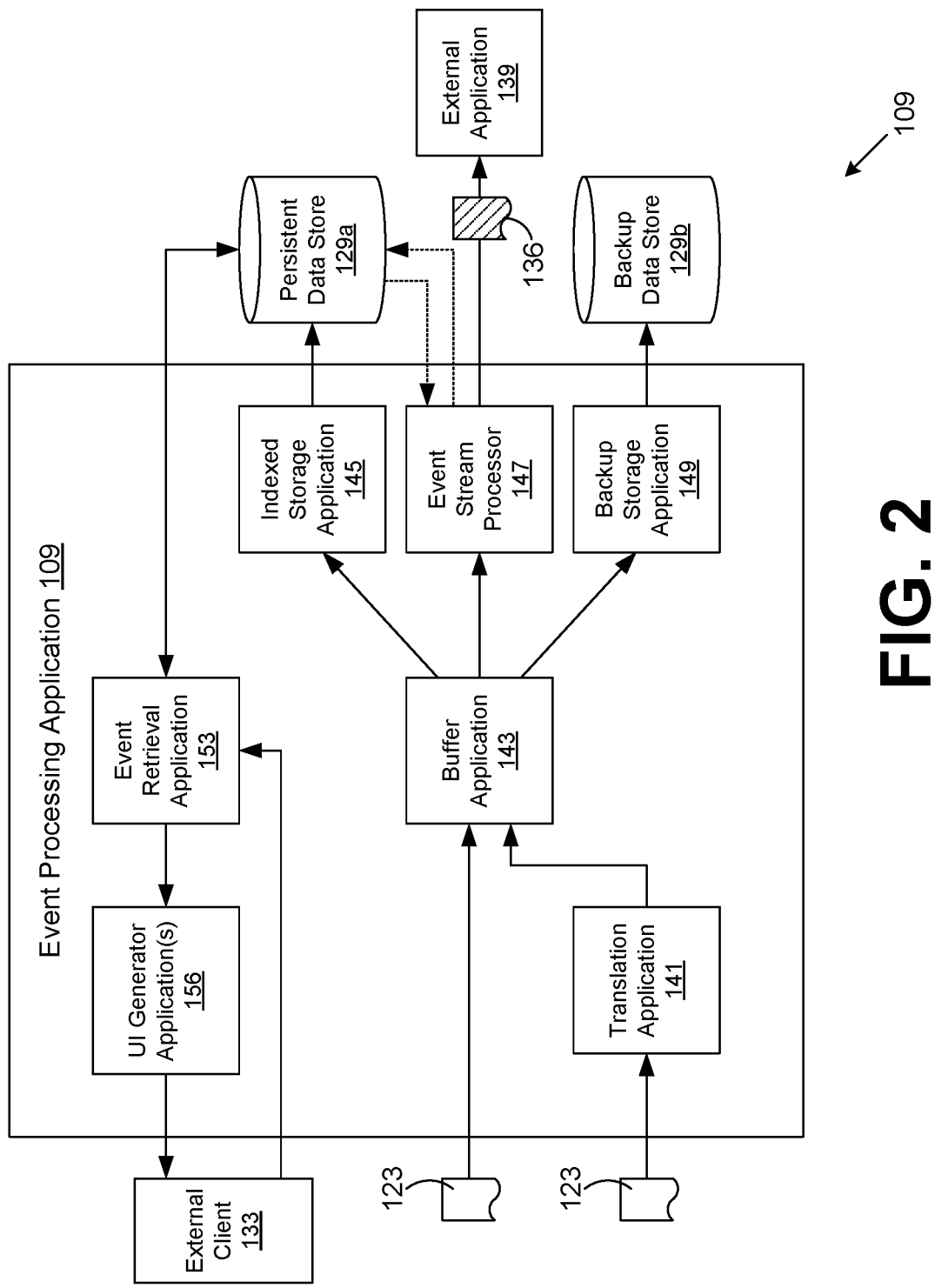
FIG. 2 is drawing that provides one example of an architecture of an event processing application implemented in the data processing system of FIG. 1 according to an embodiment of the disclosure.

With reference to FIG. 2, shown is a functional block diagram that depicts one example of the architecture of the event processing application 109. It is understood that the architecture depicted in FIG. 2 is one example of the many different architectures and approaches that may be employed to accomplish the functionality described herein.

As depicted in FIG. 2, the event processing application 109 includes a translation application 141, a buffer application 143, an indexed storage application 145, an event stream processor 147, a backup storage application 149, an event retrieval application 153, and user interface generator applications 156. Each of these applications is discussed in turn below. In addition, the event data stores 129 (FIG. 1) include a persistent data store 129a and a backup data store 129b that store events 123 and other data as will be described.

To begin, the events 123 received by the event processing application 109 may be embodied in any one of a plurality of different formats. For example, events 123 may be embodied in various formats according to various standards/protocols such as Simple Object Access Protocol (SOAP), Representational State Transfer (REST), or other standards or protocols. Alternatively, the events 123 may also be embodied in a proprietary messaging protocol employed by the event processing application 109.

In one embodiment, the event processing application 109 employs a proprietary messaging protocol. As a consequence, events 123 embodied in protocols other than the proprietary messaging protocol are received by the translation application 141 and converted over to the proprietary messaging protocol. Thereafter, the translated events 123 are applied to the buffer application 143. Alternatively, if the events 123 are embodied in the proprietary messaging protocol, they may bypass the translation application 141 and be applied directly to the buffer application 143.

The buffer application 143 serves as a buffer for the temporary storage of events 123 before they are pulled by the indexed storage application 145, the event stream processor 147, and the backup storage application 149. The buffer application 143 facilitates a multiplexed output, where each event 123 is provided to each one of the indexed storage application 145, the event stream processor 147, and the backup storage application 149. According to one embodiment, each of the indexed storage application 145, the event stream processor 147, and the backup storage application 149 are configured to "pull" events 123 from the buffer application 143. Alternatively, the events 123 may be pushed to these applications 145/147/149. If one of these three applications 145/147/149 pulls a particular event 123, the same event 123 is retained for the other two applications 145/147/149. That is to say, the buffer application 143 is configured to retain each event 123 until all three of the indexed storage application 145, the event stream processor 147, and the backup storage application 149 have obtained the events 123 for processing. In one embodiment, this may be accomplished by maintaining three separate buffers. Alternatively, tags or other markers may be maintained that indicate when a given event 123 has been accessed by any one of the indexed storage application 145, the event stream processor 147, and the backup storage application 149.

The indexed storage application 145 is configured to store events 123 in the persistent data store 129a. When stored, the events 123 are indexed so that other applications and components can easily access such events 123 for various purposes as will be described. In one embodiment, the events 123 are indexed according to the identifiers associated with the events 123, the timestamps associated with the events 123, or other information.

The event stream processor 147 is implemented to generate metrics 136 from the events 123 that may be sent to the external application 139 for monitoring or other purposes. In generating the metrics 136, the event stream processor 147 may apply heuristics or rules to the events 123 received from the services 106. To this end, the event stream processor 147 generates values based upon the events 123 that may be provided to the external applications 139 for purposes of identifying conditions for alarming, performing future performance predictions, or for other purposes. In doing so, the metrics 136 or other data monitored or otherwise used by external applications 139 to perform such functions is generated by the event stream processor 147 such that the generation of such metrics 136 or other data is decoupled from the operation of the services 106 or other systems that generate the events 123 in the first place.

In one example, a heuristic or rule may direct the event stream processor 147 to count each event 123 received that is associated with a given identifier or associated with multiple identifiers.

In another example, another metric 136 generated based upon the events 123 comprises a time duration between respective events 123 for one or more identifiers. For example, one may wish to determine the time elapsed between a "start" event 123 relating to the start of a process by one of the services 106 (FIG. 1) and an "end" event 123 associated with the process. Accordingly, a heuristic or rule may be applied that dictates that once an "end" event 123 associated with respective identifiers is received from a service 106, then the persistent data store 129a is examined to find a corresponding "start" event 123 associated with the same identifier(s) as the "end" event 123. The time duration of the process associated with the respective start and end events 123 may be calculated by subtracting the time of the start event 123 from the time of the end event 123.

In some situations, the "start" event 123 associated with a respective "end" event 123 is missing from the persistent data store 129a. This may be due to the fact that (1) the start event 123 was lost due to malfunction, (2) the start event 123 was never sent by the respective service 106, (3) the start event 123 was held up due to network problems, or (4) some other reason. In such case, a heuristic algorithm may be implemented in which the event stream processor 147 waits for a predefined period of time to wait for system convergence (i.e. that the late start event 123 is received). If the start event 123 is not received, then the heuristic may specify that a count of all "end" events 123 that are identified for which there is no corresponding "start" event 123 be incremented. Alternatively, some other action may be taken.

In another alternative, an end event 123 may be missing for a given start event 123. This may occur due to malfunction or due to the end event 123 being lost in transmission, etc. In such case, it may never be determined that the process associated with the start event 123 was ever completed. In such case, a heuristic may be specified that determines whether a period of time has elapsed within which the corresponding end event 123 should have been received, where such a time period includes extra time to ensure that the end event 123 was not simply late, etc. Assuming that the end event 123 was not received in such time, a metric such as a "zero" or other value may be generated that indicates that the end event 123 was not received, etc.

In another example, it may be the case that multiple start events 123 correspond to a given end event 123. In particular, when an end event 123 is received, it is discovered that there are multiple candidate start events 123 in the persistent data store 129a that may coincide with the end event 123. This may happen, for example, in cases where a new start event 123 associated with a new process also indicates the end of a prior process. In such case, a heuristic algorithm or rule may be implemented in which the "latest" visible start event 123 is selected from which the time duration between the start and end events 123 is determined. Alternatively, a respective start event 123 may be selected based on other criteria.

In another example, it may be the case that multiple start events 123 correspond to a given end event 123. When a given end event 123 arrives, it is unknown whether there will be additional end events 123. Multiple end events 123 may arrive, for example, when a process is repeated due to error or for other reasons. In such a case, a heuristic algorithm or rule may be implemented in which a time duration is calculated for each end event 123 relative to the single start event 123. Alternatively, a count of multiple end events 123 associated with a given start event 123 may be maintained or other action may be taken.

In some situations, there may be multiple start events 123 followed by multiple end events 123 for respective identifiers. Potentially, such events 123 may appear in a mixed order. A heuristic may be implemented in which a metric 136 is calculated for each end event 123 paired with the most recent start event 123 visible at the time the end event 123 was processed. Alternatively, some other heuristic or rule may be implemented to mate respective pairs of start and end events 123 in order to calculate appropriate time duration metrics 136.

In another situation, from time to time a process is repeated by a service 106 for various reasons. This may result in the receipt of a completely new set of certain events 123 for one or more identifiers that may appear to have already been received. This may occur for naturally repeating processes or due to malfunction, etc. In such cases, one may implement a heuristic that mandates that each end event 123 is paired with the latest start event 123 received in order to generate a time duration metric 136. This may provide varying results if end events 123 are paired with the wrong start events 123. Alternatively, other approaches may be employed.

Ultimately, the foregoing provides illustrations of the various heuristics that may be employed to respond to various events 123 such as start and end events 123, although other types of events 123 may be processed based on predefined heuristics. By application of the heuristics, rules, or other algorithms, the event stream processor 147 generates metrics 136 from the events 123 received that can be examined by one or more external applications 139 to detect various conditions associated with the operation of one or more of the services 106.

In one embodiment, the event processing application 109 thus receives events 123 without knowledge of the nature of such events 123. For example, the event stream processor 147 processes events 123 based upon the heuristics or rules set forth. Inconsistencies and anomalies in the events 123 are handled based on the heuristics or rules set forth and not based upon an intimate knowledge of the operation of the services 106. In one embodiment, the heuristics or rules are specified so that meaningful metrics 136 may be created by which conditions association with the operation of the services 106 may be detected or otherwise ascertained.

The backup storage application 149 is configured to implement a basic backup storage of the events 123 received by the event processing application 109 in the backup data store 129b. The backup storage application 149 operates to store the events 123 as they are received and does not perform substantive processing that results in a change to the events 123. This function advantageously provides for the retrieval of events 123 in situations of major failure, for example, to reestablish a steady state of operation.

The event retrieval application 153 facilitates retrieval of events 123 based upon requests from an external client 133 or other system. For example, an external client 133 may request the events 123 associated with one or more identifiers that fall within a predefined range of time. In order to facilitate the specification of events 123, the user interface generator applications 156 are configured to generate various forms for the input of parameters such as identifiers, time ranges, or other information. The event retrieval application 153 is configured to access the events 123 stored in the persistent data store 129a based upon requests from the external client 133. Alternatively, the event retrieval application 153 may access predefined data about an external client 133 that indicates the events 123 to be retrieved for the external client 133.

The retrieved events 123 are provided to one or more user interface generator applications 156 that are configured to generate user interfaces that facilitate viewing of events 123, metrics 136, or the target data 113 associated with such events 123. In one embodiment, the user interface generator applications 156 are configured to generate a dashboard or other user interface that is sent to the external client 133. Such dashboards may be configurable for a respective external client 133, where the configuration for a given external client 133 may be stored for use by the user interface generator applications 156.

Referring next to FIG. 3, shown is one example of an event 123 according to various embodiments. Associated with the event 123 are various attributes 163 or variables as shown. An event 123 is essentially an occurrence of something of interest with respect to the performance of tasks relative to the target data 113 by the services 106. An event 123 occurs at a specific time that is memorialized by a timestamp that is generated, for example, by the event reporting agent 119 (FIG. 1) or other application associated with a given one of the services 106. Each event 123 may include a name that specifically identifies the type of event 123 that has occurred. Such a name might comprise, for example, "Start Transfer," "End Transfer," "Start Store," "End Store," or any other name.

An event 123 is also tightly coupled to something identifiable such as an identifier that may comprise, for example, a single variable or a tuple of variables. For example, an identifier may comprise a tuple comprising a name space and an opaque string as shown. The name spaces are predefined in advance before the creation of the events 123 by the services 106. A restriction may be imposed on the opaque strings such that there is one and only one representation of a given identifier, such that character-wise equality is identifier-based equality.

According to one embodiment, each event 123 is assigned to exactly one identifier. In such an embodiment, one may imagine a scenario where an asset ($A_{source}$) may be split into many assets ($A_1 \ldots A_n$). This may be viewed as a single event 123 with many related identifiers called a SPLIT. To make such a collection of data meaningful, the direction and the cardinality of the SPLIT relationship is preferably understood. However, such a concept may be viewed as two separate ideas, namely, events 123 and relationships. The events 123 include the SPLIT-UP event 123 which occurred against the $A_{source}$ and many created events 123 which occurred against $A_1 \ldots A_n$. A relationship, on the other hand, may be DERIVED-FROM, and is a static concept that links the various asset identifiers correctly.

An event 123 may be placed within a given partition or domain, as indicated by the domain attribute 163. This may help isolate unrelated problem spaces and may carry additional metadata therewith. In this respect, the domain may indicate a partition such as, for example, video, text, or other partition.

The event 123 may further include a location that indicates where the event 123 occurred such as, for example, within which service 106 was the event 123 generated. When the event 123 is received by the event processing application 109, the event processing application 109 may add a time stamp to the event 123 that indicates the time that the event 123 was received. Further, the sender of the event 123 such as a respective one of the services 106 or other device may be indicated in the domain attributes 163. Finally, any particular other information may be indicated in a message as shown.

Referring next to FIG. 4, shown is a simple timeline 166 that depicts a set of events 123 recorded against a single identifier, for example, as described above with respect to FIG. 3 according to an embodiment of the disclosure. As shown, key events 123 may be highlighted to aide in the understanding of the timeline 166. In this respect, some events 123 may be depicted with a larger graphical component such as a larger circle as shown in FIG. 4. A request for all of the events 123 can be generated by an external client 133 and provided to the event retrieval application 153 that can obtain all of the events 123 stored in the persistent data store 129a associated with one or more identifiers. These events 123 may be sent back to the external client 133 through the user interface generator applications 156 that generate an appropriate user interface that depicts the events 123. In one embodiment, the events 123 may be depicted in a user interface in the form of the simple timeline 166 as shown.

With reference to FIG. 5, shown is a complex timeline 169 that depicts all events 123 that were recorded against a given identifier, or any related identifiers, between two events 123.

With reference back to FIG. 3, the event 123 indicates something that actually occurred. In a transactional system, the semantics should be to commit the work or task and then produce the event 123 showing that it was committed. Business processes may be built with the assumption that some slight percentage of events 123 may be lost. However, the loss of events 123 should be considered an exceptional occurrence. The events 123 are idempotent. In this respect, the same events 123 are not written to the persistent data store 129a (FIG. 2) twice. Thus, the services 106 may resend events 123 that they believe were lost in a prior transmission to the event processing application 109.

Since each event 123 contains a timestamp as described above, the clock upon which that timestamp is based may be of significance. To that end, each event 123 is recorded based upon the local clock at the location at which the event 123 was generated, namely, one of the services 106, or other location. If the clocks are reasonably synchronized, then the events 123 should, for the most part, appear in chronological order. However, it is possible that some events 123 may be out of place relative to other events 123 due to a lack of synchronicity between clocks in respective services 106 or other devices as can be appreciated.

Thus, when accessing events 123 in the event data store 129, respective systems may take into account that events 123 may appear out of sequence from time to time. In one embodiment, the events 123 associated with one or more identifiers may be emitted on the order of tens per second or some other greater or lesser frequency, where the time gap between meaningful events 123 is measured in accordance with the rate at which events 123 are received. The lifetime of events 123 may be as short as possible, or other time period. In one embodiment, a maximum lifetime of events 123 is approximately one year. Alternatively, other maximums may be specified.

The metrics 136 or other data that may be transmitted to external applications 139 may be reviewed in order to perform such functions as generating various alarms based upon values, making predictions about future values, combining metrics 136 to compute rates, displaying elements, and other reasons. According to one embodiment, the event processing application 109 is a lightweight system to the extent that it does not perform significant analysis or processing of events 123, but may transmit such information to other systems where such analysis is performed as desired.

The event processing application 109 may further be configured to transform data as it arrives to output summary information to external clients 133 or external applications 139. Some specific methods of data processing include the computing of a time delta that occurs between the events 123, or the counting of the number of events 123 associated with one or more identifiers or target data 113 as described above. Both methods vary on the name of the events 123 in question, and may be scoped by one or more identifiers within a given domain. For example, an external client 133 may ask to output the time between a first event 123 of a first type T1 and a second event 123 of a second type T2, where the identifiers are the same. With this data stream, standard operations such as aggregation, alarming, prediction, and other operations may be performed. In addition, much more complex expressions may be possible, where the underlying technology is likely to be based on complex event processing, a technology that may allow specific queries over time bounded event data.

Events 123 are related to other events 123 through one or more identifiers. In some situations, this makes it possible to compute deltas between events 123 as described above. Specifically, for a given timeline, one may choose specific events 123 of type T1 and T2, and subtract the time between them based upon their timestamps. If such events 123 are out of order, or if there is a mismatch between the number of T1 events 123 and the number of T2 events 123, then for a given metric collection, such metric collection is either "in progress" or "not in progress." When "in progress," it also has a "time started." The arrival of an event 123 moves such a state into "in progress." If such state was already "in progress," the "time started" may optionally be reset. When the end event 123 arrives, it may transition to "not in progress" and emit the end event 123. As mentioned above, the event processing application 109 provides the ability to fetch timelines based upon one or more identifiers. For example, it is possible to fetch the events 123 that pertain to specific vendor SKUs or other identifiers.

It will also be possible to iterate over the events 123 that occurred between two specific points in time, although perhaps such an approach is not entirely efficient to locate information. Alternatively, additional secondary indexes may be provided on location and name of an event 123, within a query that is bounded by time, so that common inquiries may be serviced rapidly. Given that the events 123 are immutable, the data returned by any queries about events 123 generated in the past are always suitable for caching.

The event processing application 109 may be configured to comport with any service level agreements with regard to the number of events 123 received and recorded in the event data store 129. Also, service level agreements may apply to information associated with the events 123 stored in the event data store 129 that is delivered to external clients 133 or external applications 139 as described above. In one embodiment, the event processing application 109 will make a best effort to record the events 123 and deliver such information as needed. Also, various data retention policies may be specified with respect to the events 123 stored in the event data stores 129.

The events 123 are stored in the persistent data store 129a in a durable manner and eventual consistency of the events 123 is contemplated, given that events 123 are immutable, so that a primary concern of convergence is addressed when a writer can read its write. The events 123 are idempotent such that they can be rewritten to the event data store 129, but will not be written twice as can be appreciated. The various queries that may be received by the event retrieval application 153 may include a fast lookup by a primary key such as an identifier, a fast iteration over a range of timestamps, or a reasonable lookup by a secondary key within a time range such as location, or name of an event 123.

Various failure modes may also exist such as a failure to process the events 123 or failure to record the events 123 as can be appreciated. In addition, the domain attributes 163 of the events 123 may be employed to partition data at some level. The partition name may also be based upon the identifiers or other information. The exact partitioning may evolve over time, resulting in a number of "active" partitioning schemes, all of which may be searched when obtaining the events 123 from the event data store 129. In one embodiment, the events 123 are only stored in the persistent data store 129a for a limited time. As such, old schemes and storage partitions will gradually disappear from the event data store 129.

In other embodiments, event processing nodes may also be employed to compute queries based upon a stream of events 123 from the services 106 in order to emit data to external applications 139. Such event processing nodes may be general purpose complex event processing (CEP) nodes or they may be customized systems to support specific use cases. Such event processing nodes may handle any number of events 123 per second and may be confirmed based upon empirical evidence.

Further, event query nodes may be employed to provide a basic abstraction to persistent store capability of the event processing application 109. Such event query nodes may allow iteration over events 123, queries against keys, etc. The typical types of queries that may be employed to access the events 123 in the event data store 129 may comprise, for example, finding events 123 of a type X against a key Y (i.e., an identifier) or finding all events 123 that took place against a key Y (i.e., an identifier). Also, one may query to find events 123 of a given type E that occur during a time interval T expressed in terms of a start date/time and end date/time that expresses a time interval T that lasts for several milliseconds, seconds, minutes, hours, days, or other time interval. Further, one may query to find events 123 that happened on a specific host H (service 106) during a time interval T, or one may query to find events 123 emitted by a source S (service 106) during a time interval T.

Further, user interfaces may be generated by the user interface generator applications 156 that facilitate identifier agnostic searching and visualization of the events 123. In addition, the event processing application 109 may be configured to provide appropriate user interfaces for external clients 133. Such user interfaces may provide appropriate operational dashboards or other interfaces as can be appreciated.

In addition, it may be necessary at times to combine events 123 that are logged against separate identifiers into a single timeline as described above. For example, one part of a workflow pipeline 103 may only know of a first identifier, while another portion of the workflow pipeline 103 assigns a second identifier. It may be necessary to combine such events 123 under a common identifier for proper access. Alternatively, both identifiers may be used to pull all events 123 into a single timeline or other rendering.

The event processing application 109 provides various advantages in that it provides a single central point for consolidation of events 123. In this respect, each of the services 106 is not required to maintain its own event tracking system or other system to obtain data therefrom as described above. Further, once the basic system is in place, there is minimal cost for operation and more complexity may be added to access the events 123 by adding instrumentation to the various components of the event processing application 109 as time progresses. Further, the event processing application 109 may be configured to meet an acceptable service level agreement that is published for all operators of the services 106 such that the functionality provided by the event processing application 109 may be employed by many customers that can depend upon the service level agreement.

Figure 6:
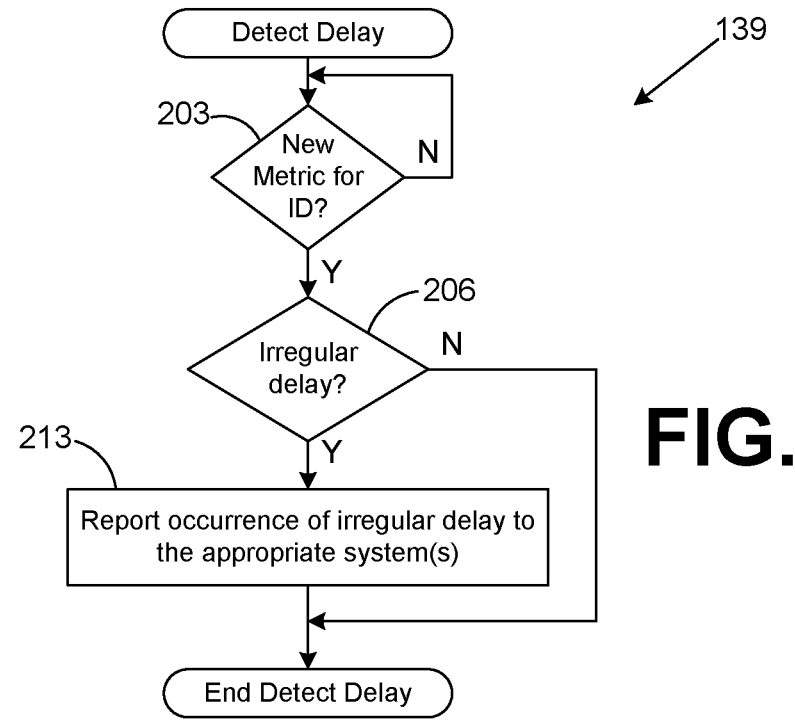
FIG. 6 is a flow chart that illustrates one example of an external application that acts upon metrics and data generated by the event processing application of FIG. 2 according to an embodiment of the disclosure.

Next, with reference to FIG. 6, shown is one example of a flowchart that illustrates one example of the operation of an external application 139 according to various embodiments. Alternatively, the flowchart of FIG. 6 may be viewed as steps of a method implemented in an external server or other system as can be appreciated. The flowchart of FIG. 6 depicts one example of the operation of an external application 139 in detecting an undesirable delay between the receipt of chronologically consecutive events 123 during the processing of target data 113 through the workflow pipeline 103 as described above. Specifically, if a delay occurs between any two chronologically consecutive events 123 received from the services 106 that extends beyond a reasonable predefined delay, then such delay is indicative of the fact that there might be a stalled service 106 or some other anomaly exists in the respective system.

Beginning with box 203, first the external application 139 determines whether there is a new metric 136 for a respective identifier received from the services 106 indicating a time period between a respective pair of "start" and "end" events 123 associated with one or more identifiers. If so, then in box 206, the external application 139 determines whether the delay between the events 123 indicated by the metric 136 is irregular such that it indicates a stalling of a service 106, or other irregularity that may require personnel to follow up to address the situation. The determination of whether a delay is irregular may be made by comparing the delay to predefined delay thresholds or in some other manner. If not, then the external application 139 ends as shown. Otherwise, the application proceeds to box 213 in which the occurrence of the irregular delay is reported to appropriate systems. In this respect, the external application 139 may generate a notification that is transmitted to an appropriate system that facilitates corrective action or informs personnel as to the problem. Thereafter, the external application 139 ends.

It should be noted that the above flowchart provides only one example of the types of functionality that may be implemented by an external application 139. Other processes may be implemented based on other metrics 136 such as those generated by the counting of events 123 received that include one or more identifiers or other functions as can be appreciated.

Figure 7:
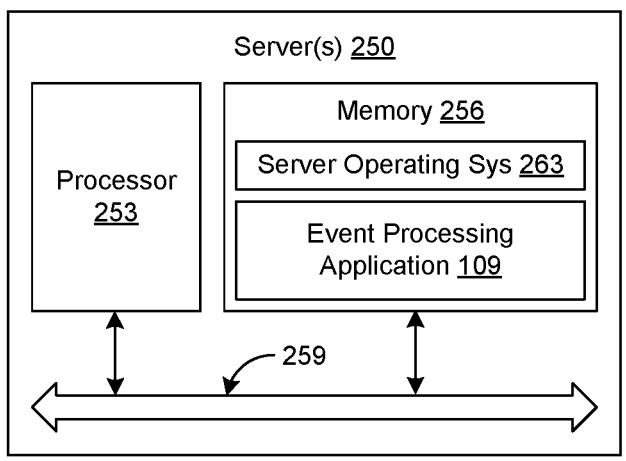
FIG. 7 is a schematic block diagram of a server that may be employed to execute an event processing application of FIG. 2 according to an embodiment of the disclosure.

Referring next to FIG. 7, shown is a schematic block diagram of one example of a server 250 according to an embodiment of the present disclosure. The server 250 includes a processor circuit, for example, having a processor 253 and a memory 256, both of which are coupled to a local interface 259. To this end, the server 250 may comprise, for example, a server computer with such structure. The local interface 259 may comprise, for example, a data bus with an accompanying address/control bus as can be appreciated.

Stored in the memory 256 are several components that are executable by the processor 253 or that are stored within the memory 256. In particular, according to one embodiment, stored in the memory 256 are a server operating system 263 and the event processing application 109. It is understood that there may be other applications that are stored in the memory 256 and are executable by the processor 253 as can be appreciated. Also, the data stores 129a and 129b may be included in the server 250 or may be located in other storage sites that are accessible to the server 250, etc.

The various components such as the services 106 and the event processing application 109 may be implemented on servers that communicate with each other via a network. Such a network may comprise, for example, the Internet, intranets, wide area networks (WANs), local area networks, wireless networks, or other suitable networks, etc., or any combination of two or more such networks.

A number of software components are stored in the memory 256 and are executable by the processor 253. In this respect, the term "executable" means a program file that is in a form that can ultimately be run by the processor 253. Examples of executable programs may be, for example, a compiled program that can be translated into machine code in a format that can be loaded into a random access portion of the memory 256 and run by the processor 253, or source code that may be expressed in proper format such as object code that is capable of being loaded into a of random access portion of the memory 256 and executed by the processor 253, etc. An executable program may be stored in any portion or component of the memory 256 including, for example, random access memory, read-only memory, a hard drive, compact disk (CD), floppy disk, or other memory components.

The memory 256 is defined herein as both volatile and nonvolatile memory and data storage components. Volatile components are those that do not retain data values upon loss of power. Nonvolatile components are those that retain data upon a loss of power. Thus, the memory 256 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 253 may represent multiple processors and the memory 256 may represent multiple memories that operate in parallel. In such a case, the local interface 259 may be an appropriate network that facilitates communication between any two of the multiple processors, between any processor and any one of the memories, or between any two of the memories etc. The processor 253 may be of electrical, optical, or some other construction as can be appreciated by those with ordinary skill in the art.

The various function systems and applications described herein may be implemented using any one of a number of programming languages such as, for example, C, C++, JAVA, or other programming languages.

Although the various components of the data processing system 100 are generally described as being embodied in software or code executed by general purpose hardware as discussed above, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow chart of FIG. 6 shows one example of an implementation of an external application 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the various components of the data processing system 100 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the component of the data processing system 100 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device;
   an event processing application executable in the at least one computing device comprising program instructions that, when executed, direct the at least one computing device to:
   receive, from a plurality of services comprising an instance of an event reporting agent executing thereon, a plurality of events that describe a state of a workflow pipeline in which data is processed by the plurality of services, wherein individual ones of the plurality of events comprise a timestamp and an identifier;
   store the plurality of events in a data store;
   in response to a request from an external process, generate at least one metric describing an operational condition of at least one of the plurality of services based at least in part on a portion of the plurality of events stored in association with the at least one of the plurality of services;
   determine that a delay between subsequent ones of the plurality of events is irregular based at least in part on the at least one metric describing the operational condition a predefined delay threshold;

in response to the at least one metric exceeding the predefined delay threshold, cause a preconfigured action to be performed;

generate a dashboard comprising at least one user interface, the at least one user interface generated to facilitate a viewing of the plurality of events, the at least one metric, or target data associated with the data as processed by the plurality of services; and send the at least one user interface to an external client device.

2. The system of claim 1, further comprising a buffer application configured to retain individual ones of the plurality of events in a buffer until the individual ones of the plurality of events are obtained for processing by at least one external application or service.

3. The system of claim 1, wherein the plurality of events indicate at least one of: at least one task in a processing of the data by the plurality of services has started, the at least one task has been completed, or a component portion of the at least one task has been completed.

4. The system of claim 1, wherein the at least one computing device comprises a plurality of server computing devices; and wherein the instance of the event reporting agent is executed on independent ones of the plurality of server computing devices.

5. The system of claim 4, wherein the server computing devices are located remotely from the plurality of services.

6. The system of claim 1, further comprising program instructions that, when executed, direct the at least one computing device to retrieve, prior to sending the at least one user interface to the external client device, a request from the external client device for a subset of the plurality of events based at least in part on an input of at least one parameter.

7. The system of claim 6, wherein the at least one parameter comprises the identifier for a respective one of the plurality of events or a time range.

8. A computer-implemented method, comprising:

receiving, by at least one computing device, a plurality of events from a plurality of services comprising an event reporting agent executing thereon, the plurality of events generated to describe a state of a workflow pipeline in which data is processed by the plurality of services, wherein individual ones of the plurality of events comprise a timestamp and an identifier;

in response to a request from an external process, determining, by the at least one computing device, an operational condition of at least one of the plurality of services based at least in part on a portion of the plurality of events stored in association with the at least one of the plurality of services;

determining, by the at least one computing device, that a delay between subsequent ones of the plurality of events is irregular based at least in part on the operational condition;

identifying, by the at least one computing device, a preconfigured action that facilitates corrective action to be performed based at least in part on the operational condition of the at least one of the plurality of services; and causing, by the at least one computing device, the preconfigured action to be performed.

9. The computer-implemented method of claim 8, wherein the plurality of events indicate at least one of: at least one task in a processing of the data by the plurality of services has started, the at least one task has been completed, or a component portion of the at least one task has been completed.

10. The computer-implemented method of claim 8, further comprising:

generating, by the at least one computing device, a dashboard comprising at least one user interface, the at least one user interface generated to facilitate a viewing of the plurality of events, the at least one metric, or target data associated with the data as processed by the plurality of services; and sending, by the at least one computing device, the at least one user interface to an external client device.

11. The computer-implemented method of claim 10, further comprising retrieving, by the at least one computing device, prior to sending the at least one user interface to the external client device, a request from the external client device for a subset of the plurality of events based at least in part on an input of at least one parameter.

12. The computer-implemented method of claim 11, wherein the at least one parameter comprises the identifier for a respective one of the plurality of events or a time range.

13. The computer-implemented method of claim 8, wherein the plurality of the events are received from the plurality of services asynchronously.

14. The computer-implemented method of claim 8, further comprising sending, by the at least one computing device, a notification that to an external system that facilitates corrective action or informs personnel as to the operational condition associated with an operation of the plurality of services.

15. A non-transitory computer-readable medium embodying program instructions executable by at least one computing device that, when executed, direct the at least one computing device to:

receive, from a plurality of services comprising an instance of an event reporting agent executing thereon, a plurality of events that describe a state of a workflow pipeline in which data is processed by the plurality of services, wherein individual ones of the plurality of events comprise a timestamp and an identifier;

in response to a request from an external process, generate at least one metric describing an operational condition of at least one of the plurality of services based at least in part on a portion of the plurality of events stored in association with the at least one of the plurality of services;

determine that a delay between subsequent ones of the plurality of events is irregular based at least in part on the at least one metric describing the operational condition exceeding a predefined delay threshold; and in response to the at least one metric exceeding the predefined delay threshold, cause a preconfigured action to be performed that facilitates corrective action in association with the delay.

16. The non-transitory computer-readable medium of claim 15, wherein the identifier uniquely identifies one of the plurality of services and the at least one metric is generated based at least in part on a time interval between chronologically adjacent ones of the plurality of events associated with the identifier.

17. The non-transitory computer-readable medium of claim 15, further comprising program instructions that, when executed, further direct the at least one computing device to send the at least one metric to an external process to identify a condition associated with an operation of the plurality of services.

18. The non-transitory computer-readable medium of claim 15, wherein the data is processed by the at least one computing device to compress, translate, or reformat target data to generated processed data.

19. The non-transitory computer-readable medium of claim 15, further comprising program instructions that, when executed, further direct the at least one computing device to perform an indexed storage of the plurality of events in a data store.

20. The non-transitory computer-readable medium of claim 15, wherein the event reporting agent is further configured to insert a first timestamp as an attribute of the at least one of the plurality of events describing a time at which the at least one of the plurality of events was generated by a corresponding one of the plurality of services.

* * * * *